United States Patent [19]
Morlack et al.

[11] Patent Number: 5,104,350
[45] Date of Patent: Apr. 14, 1992

[54] ANIMAL DECAPTIATION APPARATUS

[76] Inventors: Sean C. Morlack, 10414 W. Calle de Oro, Phoenix, Ariz. 85039; Henry B. Rue, 104 S. Hemlock Cir., Ruidoso, N. Mex. 88345

[21] Appl. No.: 760,081

[22] Filed: Sep. 16, 1991

[51] Int. Cl.⁵ .............................................. A22B 3/08
[52] U.S. Cl. ........................................ 452/64; 83/613; 83/631
[58] Field of Search ................... 452/64; 83/613, 631

[56] References Cited
U.S. PATENT DOCUMENTS

| | | | |
|---|---|---|---|
| 369,872 | 9/1887 | Olsen et al. | 83/613 |
| 1,419,789 | 6/1922 | Webb | 83/631 |
| 2,087,728 | 7/1937 | Boriski | 83/631 |
| 3,203,036 | 8/1965 | Allison | 452/64 |
| 4,120,075 | 10/1978 | Rypstat | 452/64 |

*Primary Examiner*—Willis Little
*Attorney, Agent, or Firm*—Leon Gilden

[57] ABSTRACT

An apparatus includes a support base, the support base including a top and bottom wall arranged in a parallel relationship, with the top wall including a lower track, with an upper track spaced from the lower track in a parallel confronting relationship to receive a slide plate therewithin. The slide plate cooperates with a portal opening directed through a guide flange extending co-extensively between the upper and lower guide tracks, with the slide plate including a cutting edge defining an acute included angle between the lower track and the cutting edge directed past the portal to effect a cutting procedure. A support tray mounting a handle, with wheel members mounted to the base adjacent the lower wall effects ease of transport and manipulation of the apparatus. A modification of the invention includes a fluid chemical receiving sponge mounted within and above the portal to receive a fluid chemical from an overlying reservoir to effect anesthesizing of the associated animal prior to a cutting procedure.

5 Claims, 6 Drawing Sheets

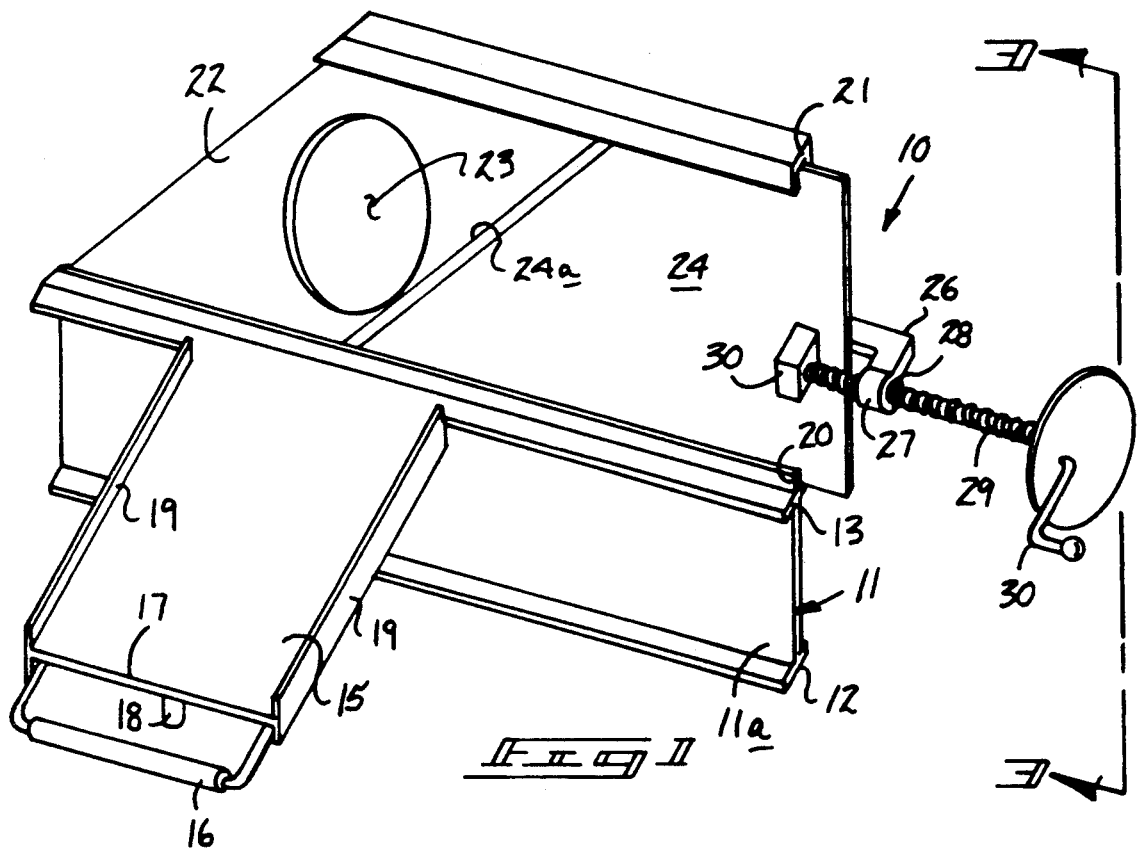
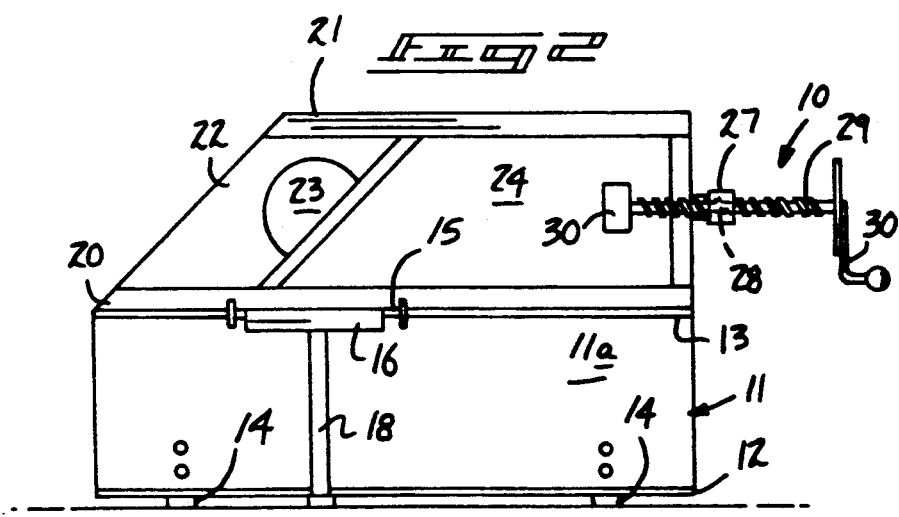

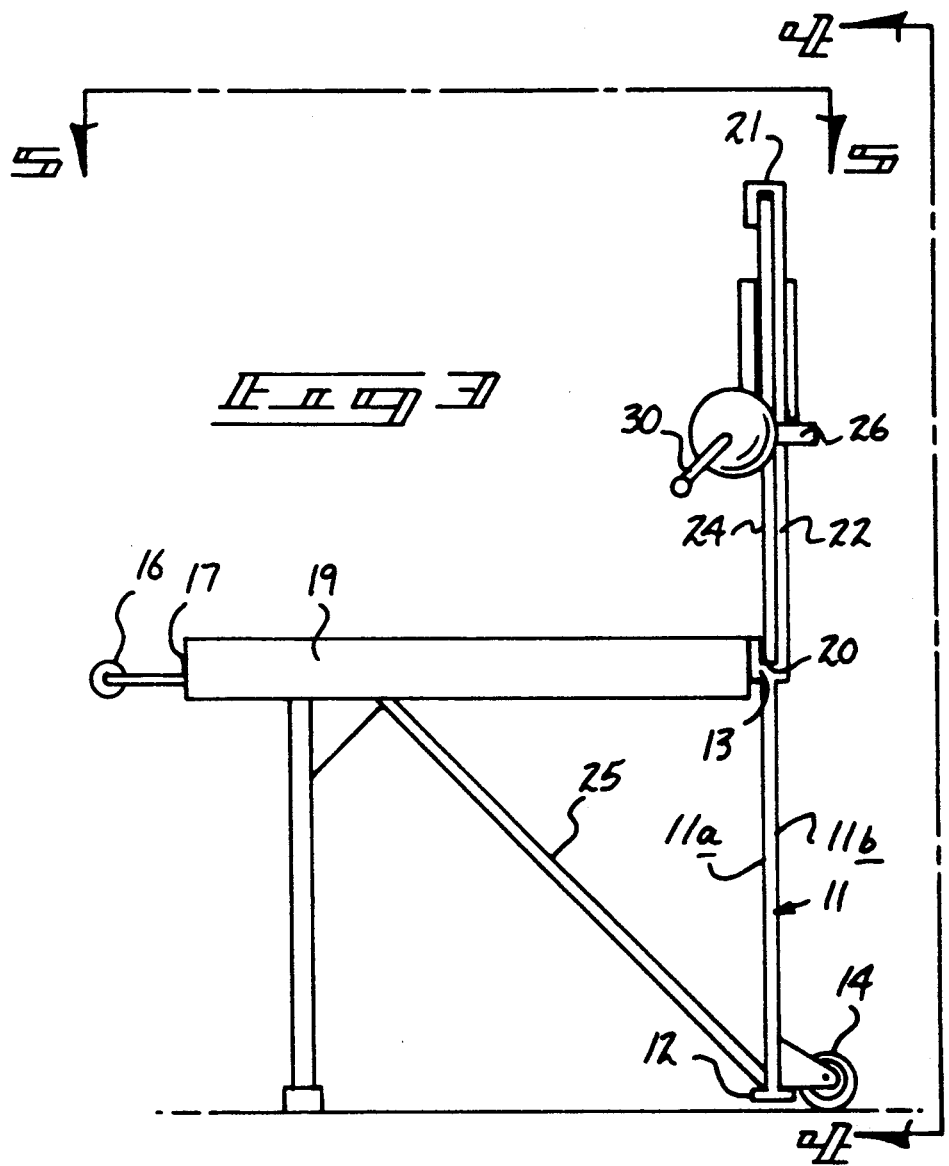
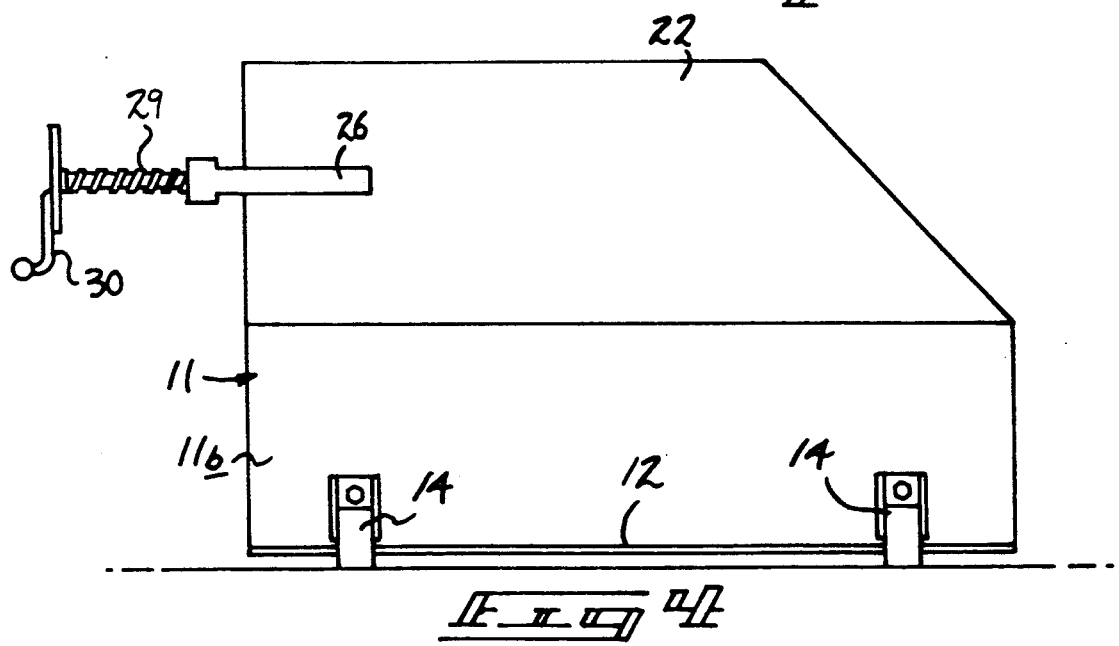

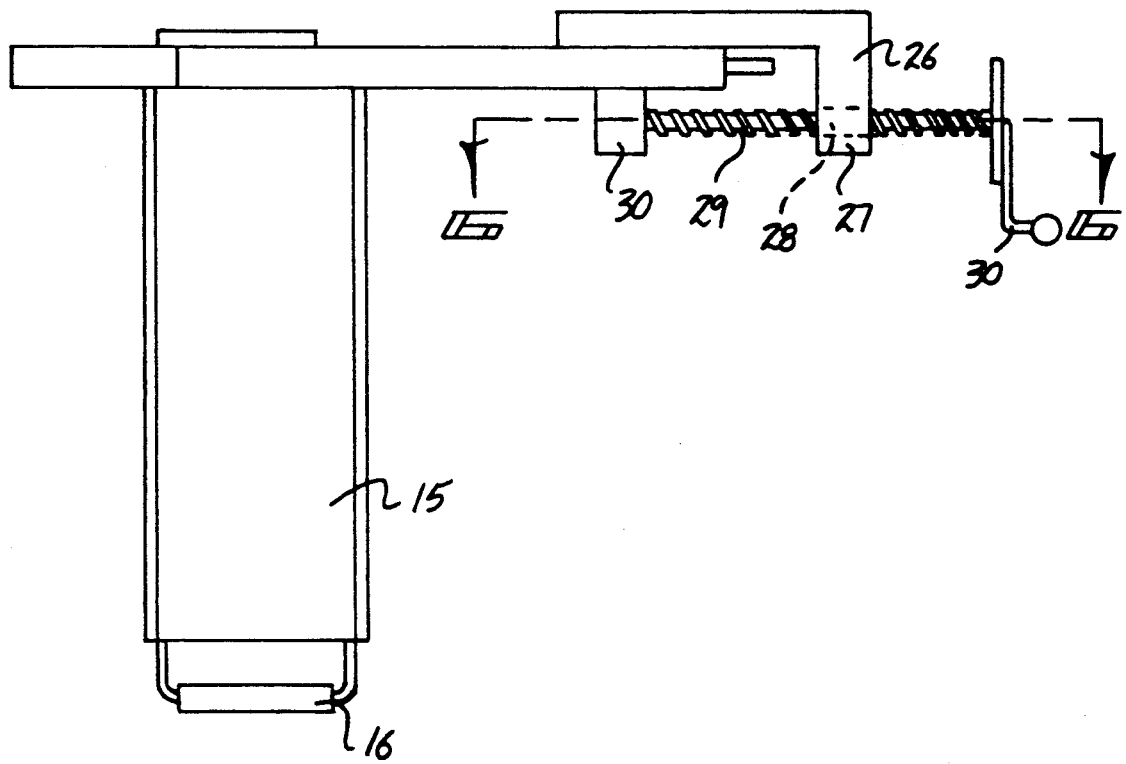
FIG 5
FIG 6
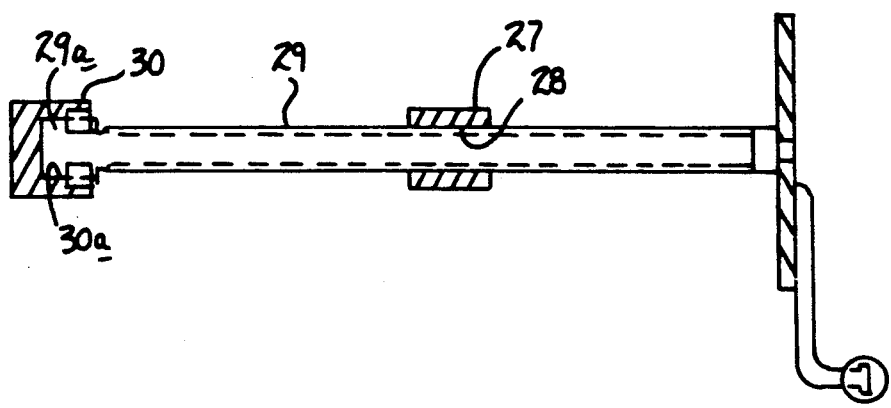

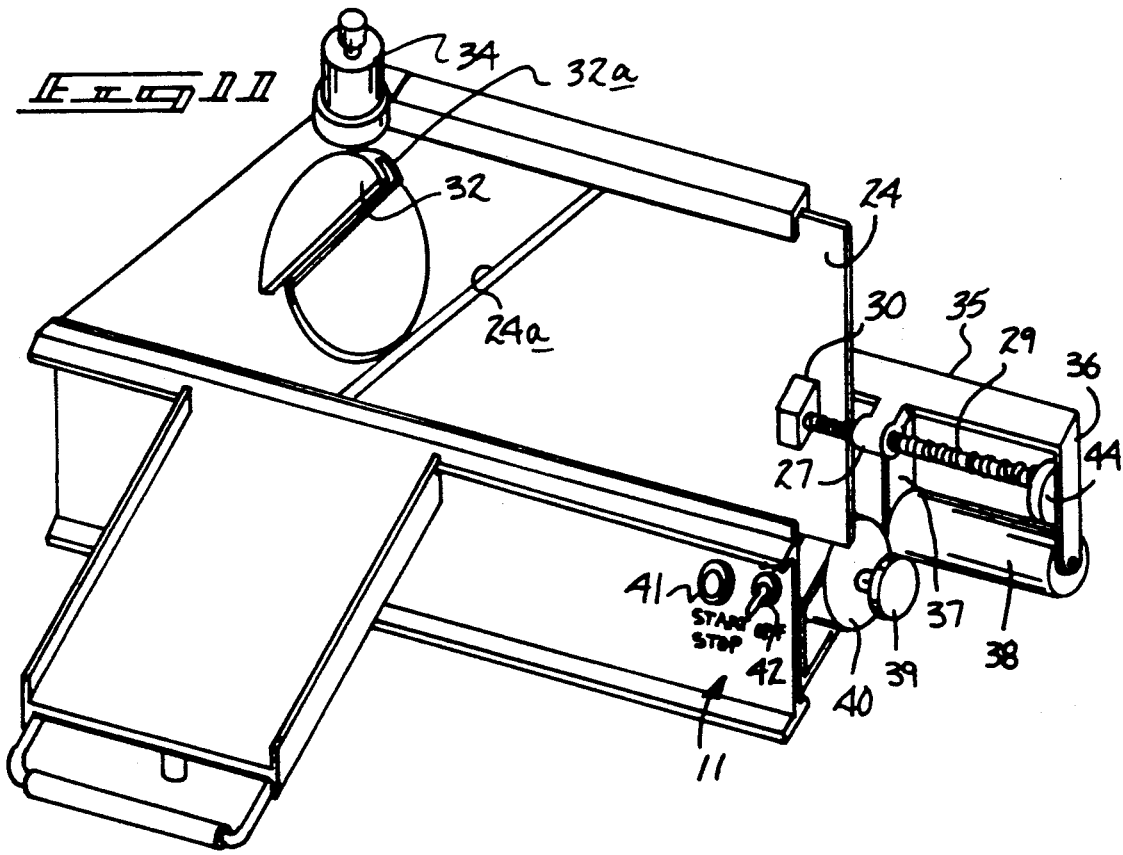
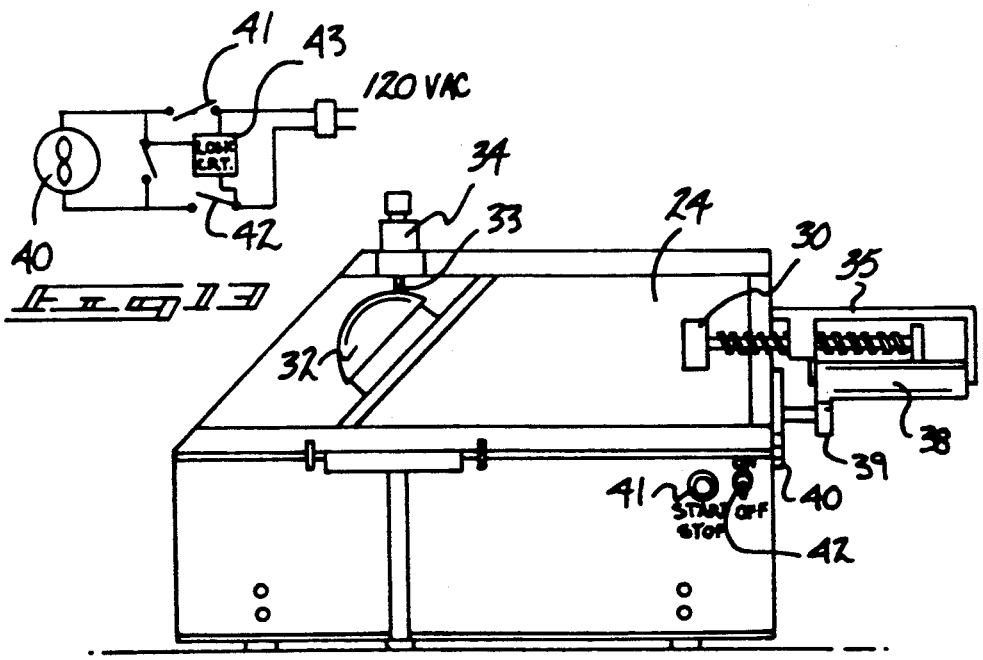

ANIMAL DECAPTIATION APPARATUS

BACKGROUND OF THE INVENTION

1. Field of the Invention

The field of invention relates to decapitation apparatus, and more particularly pertains to a new and improved animal decapitation apparatus wherein the same provides an efficient and effective manner of separating an animal head relative to the associated torso.

2. Description of the Prior Art

Animal decapitation apparatus of various types are utilized in the prior art in various butchering and slaughtering scenarios. For example, U.S. Pat. No. 4,354,296 to Robinson sets forth a poultry killing apparatus wherein poultry is directed in a conveyor belt relative to a processing arrangement, as is similarly illustrated and described in U.S. Pat. No. 3,956,794 to Verbakel.

U.S. Pat. No. 3,514,809 to Barbour, et al. and U.S. Pat. No. 4,257,143 to Lewis are further examples of poultry decapitation apparatus utilizing structure for association with conveyor belt organizations.

Accordingly, it may be appreciated that there continues to be a need for a new and improved animal decapitation apparatus as set forth by the instant invention which addresses both the problems of ease of use as well as effectiveness in construction in providing a humane and efficient manner of animal decapitation and in this respect, the present invention substantially fulfills this need.

SUMMARY OF THE INVENTION

In view of the foregoing disadvantages inherent in the known types of animal decapitation apparatus now present in the prior art, the present invention provides an animal decapitation apparatus wherein the same utilizes a cutting blade operative in a track structure to effect severing and removal of a head portion relative to an animal torso. As such, the general purpose of the present invention, which will be described subsequently in greater detail, is to provide a new and improved animal decapitation apparatus which has all the advantages of the prior art animal decapitation apparatus and none of the disadvantages.

To attain this, the present invention provides an apparatus including a support base, the support base including a top and bottom wall arranged in a parallel relationship, with the top wall including a lower track, with an upper track spaced from the lower track in a parallel confronting relationship to receive a slide plate therewithin. The slide plate cooperates with a portal opening directed through a guide flange extending coextensively between the upper and lower guide tracks, with the slide plate including a cutting edge defining an acute included angle between the lower track and the cutting edge directed past the portal to effect a cutting procedure. A support tray mounting a handle, with wheel members mounted to the base adjacent the lower wall effects ease of transport and manipulation of the apparatus. A modification of the invention includes a fluid chemical receiving sponge mounted within and above the portal to receive a fluid chemical from an overlying reservoir to effect anesthesizing of the associated animal prior to a cutting procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal decapitation apparatus which has all the advantages of the prior art animal decapitation apparatus and none of the disadvantages.

It is another object of the present invention to provide a new and improved animal decapitation apparatus which may be easily and efficiently manufactured and marketed.

It is a further object of the present invention to provide a new and improved animal decapitation apparatus which is of a durable and reliable construction.

An even further object of the present invention is to provide a new and improved animal decapitation apparatus which is susceptible of a low cost of manufacture with regard to both materials and labor, and which accordingly is then susceptible of low prices of sale to the consuming public, thereby making such animal decapitation apparatus economically available to the buying public.

Still yet another object of the present invention is to provide a new and improved animal decapitation apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic frontal view, taken in elevation, of the invention.

FIG. 3 is an orthographic end view, taken in elevation, of the invention.

FIG. 4 is an orthographic view, taken along the lines 4—4 of FIG. 3 in the direction indicated by the arrows.

FIG. 5 is an orthographic view, taken along the lines 5—5 of FIG. 3 in the direction indicated by the arrows.

FIG. 6 is an orthographic view, taken along the lines 6—6 of FIG. 5 in the direction indicated by the arrows.

FIG. 11 is an isometric illustration of the invention utilizing a power driven screw feed of the associated slide plate.

FIG. 12 is an orthographic frontal view of the invention, as set forth in FIG. 11.

FIG. 13 is a diagrammatic electrical illustration of the invention in operation of the drive motor.

DESCRIPTION OF THE PREFERRED EMBODIMENT

Figure 7:
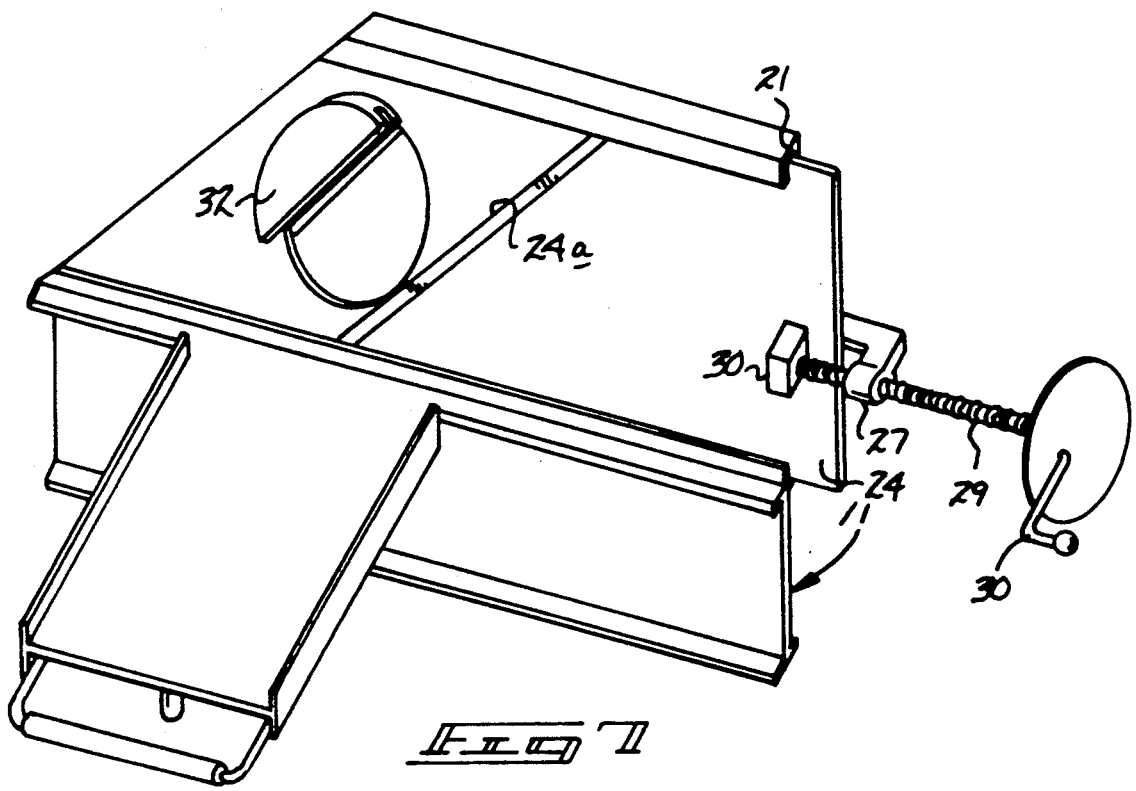
FIG. 7 is an isometric illustration of a modification of the invention.
Figure 8:
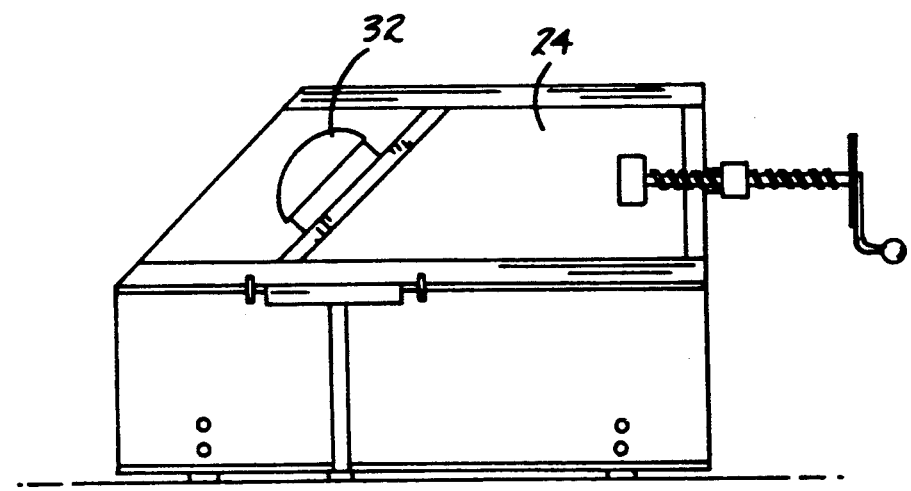
FIG. 8 is an orthographic frontal view of the invention, as illustrated in FIG. 7.
Figure 9:
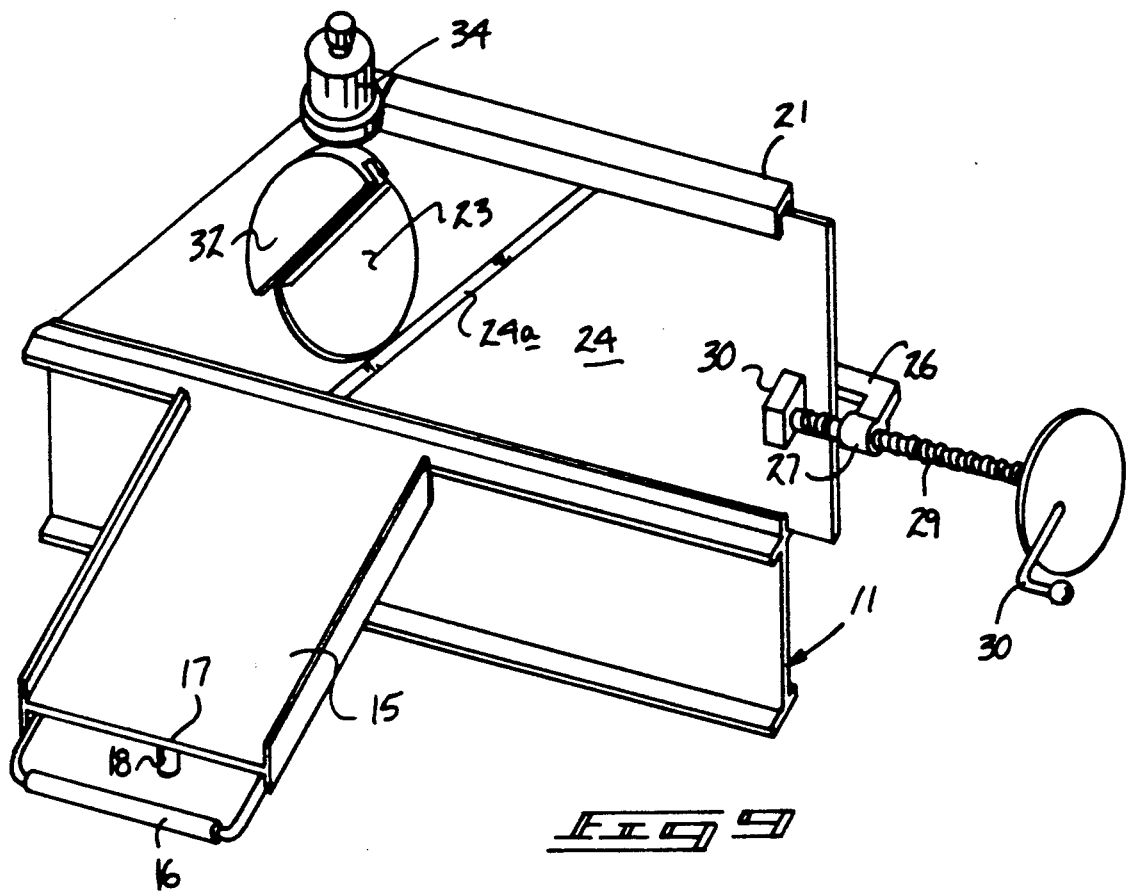
FIG. 9 is a further modification of the invention, as set forth in FIGS. 1 and 7.
Figure 10:
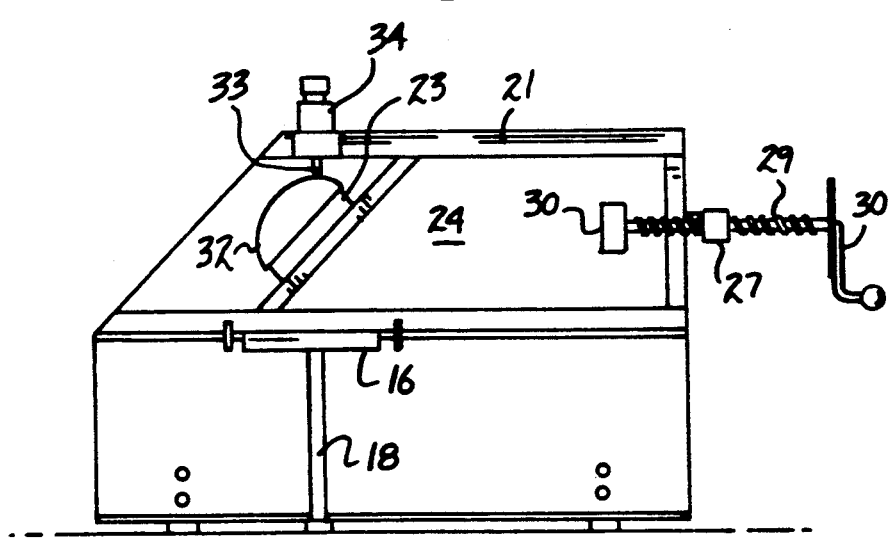
FIG. 10 is an orthographic frontal view of the invention, as illustrated in FIG. 9.

With reference now to the drawings, and in particular to FIGS. 1-13 thereof, a new and improved animal decapitation apparatus embodying the principles and concepts of the present invention and generally designated by the reference numeral 10 will be described.

More specifically, the animal decapitation apparatus 10 of the instant invention essentially comprises a support 11. The support base 11 includes a support base forward planar surface 11a spaced from and parallel a support base rear planar surface 11b. A support base bottom wall 12 is spaced from and parallel a support base top wall 13 that are orthogonally oriented relative to the forward and rear surfaces 11a and 11b. A plurality of roller wheels 14 are fixedly mounted to the rear surface 11b and extend below the bottom wall 12. A support tray 15 is fixedly mounted to the top wall 12 extending orthogonally relative to the planar forward surface 11a to include a support tray forward edge 17, with a leg 18 mounted to a bottom surface of the support tray 15 to support the tray 15 at a top surface thereof in a coextensive relationship relative to the top wall 13. A handle 16 is fixedly mounted to extend beyond the forward edge 17, whereupon lifting of the handle 17 permits rolling of the organization about the roller wheels 14. Support tray parallel retainer flanges 19 are mounted coextensively to the side edges of the support tray 15 to contain an animal positioned to the top surface thereof. It should be further noted that a reinforcing rod 25 extends between the bottom surface of the slide tray 15 and the bottom wall 12 to provide rigidity and geometric integrity in association of the slide tray 15 relative to the support base 11, and more specifically the top wall 13 thereof.

A lower slide track 20 is mounted to the top wall 13, with an upper slide track 21 spaced above the lower track in a confronting parallel relationship to include a stationary guide flange 22 extending coextensively between the upper and lower guide tracks to provide a slide surface to slidably receive and guide a slide plate 24 slidably received within the lower and upper slide tracks 20 and 21 in a sliding relationship relative to the guide flange 22. The guide flange 22 includes a portal opening 23 directed through the guide flange whose axis medially bisects and is spaced in a parallel spaced relationship above the support tray 15 to properly orient the portal opening 23 relative to the support tray 15. A slide plate cutting edge 14a is integrally formed to a forward edge portion of the slide plate 24, wherein the cutting edge is oriented at an acute included angle between the cutting edge 24a and the lower slide track 20, as well as the top wall 13 to provide for a more efficient slicing operation relative to the portal opening 23.

An "L" shaped screw support block 26 is fixedly mounted to a rear surface of the stationary guide flange 22 to include a guide block 27, wherein the guide block 27 includes an internally threaded guide block bore 28 whose axis is arranged parallel relative to the slide plate 24 and orthogonally oriented relative to the portal opening axis of the portal opening 23. An externally threaded drive rod 29 is threadedly received within and through the guide block bore 28 whose forward terminal end terminates in an enlarged head 29a rotatably mounted within a cylindrical cavity 30a of a drive rod support block 30 that is fixedly mounted to a forward surface of the slide plate 24. A rear end portion of the drive rod 29 includes a crank handle 31 to effect manual rotation and projection of the slide plate 24 and its associated cutting edge 24a in a cooperating slicing procedure relative to the portal opening 23.

A modification of the invention, as illustrated in the FIGS. 7-12, includes a sponge web 32 positioned above and within the portal opening 23, wherein the sponge web cooperates with a chloroform applicator nozzle 33 mounted in fluid communication with a chloroform reservoir 34, with the reservoir 34 fixedly mounted to the upper track 31, with the nozzle 33 positioned above and adjacent the sponge web 32 to permit directing of chloroform onto the sponge web to provide an initial anesthesizing of an animal positioned within the portal 23.

The FIGS. 11-13 illustrate a modified screw support block 35, wherein the guide block 27 is positioned as described above, but wherein the support block 35 includes spaced parallel rear and forward flanges 36 and 37 orthogonally oriented relative to the support block 35, wherein the flanges 36 and 37 are arranged parallel relative to one another and orthogonally relative to the support base rear surface 11b to rotatably mount a resilient driven cylinder 38 coextensively between lower terminal ends of the flanges 36 and 37. A drive roller 39 is fixedly mounted to a reversing motor member 40 to effect driving of the cylinder 38 upon actuation of the drive motor member 40 through the use of an on/off switch 42 and an associated start/stop switch 41. As required, a micro-switch 43 is provided wherein the motor 40 is of a reversing configuration and may include conventional switches or the logic circuit, whereupon the drive motor is reversed to return to a position of origination subsequent to its traversal and the associated cutting blade 24a beyond the portal 23. It should be noted that the sponge web 32 includes a slot 32a to receive the cutting edge 24a to provide for a continuous cutting pass of the cutting edge 24a in association with the portal opening 23.

It should be understood therefore that upon rotation of the drive roller 39, rotation of the resilient driven cylinder 38 will be effected, wherein a further drive roller 44 is fixedly mounted to a rear terminal end of the drive rod 29 to effect rotation of the drive rod and accordingly forward projection of the slide plate 24 within the upper and lower tracks 21 and 20 respectively.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal decapitation apparatus, comprising in combination,
    a support base, the support base including a top wall spaced from and parallel a bottom wall, and
    a forward surface spaced from and parallel a rear surface, wherein the forward and rear surfaces extend coextensively between the top wall and the bottom wall, and
    a support tray orthogonally mounted to the top wall, with the support tray including a support tray top surface coextensive with the top wall, and the support tray including a support tray forward edge spaced from the top wall, and
    a support tray leg fixedly mounted to the support tray extending orthogonally relative to the support tray oriented below the support tray, and
    a support tray handle fixedly mounted to the support tray in a spaced relationship relative to the support tray forward edge, and
    a plurality of roller wheels mounted to the support base rear surface, wherein each roller wheel of the plurality of roller wheels extends below the support base bottom wall, and
    a stationary guide flange orthogonally mounted to the support base top wall extending above the support base top wall, with the stationary guide flange including a lower slide track fixedly and coextensively mounted to the guide flange at a lower edge of the guide flange, and an upper slide track fixedly and coextensively mounted to the stationary guide flange at an upper edge of the guide flange, and a slide plate slidably received within the lower slide track and the upper slide track, wherein the slide plate is arranged for a sliding contiguous communication with the stationary guide flange, and
    the slide plate including a cutting edge, the cutting edge oriented at an acute included angle between the cutting edge and the support base top wall, and
    a stationary guide flange portal opening directed through the guide flange between the lower slide track and the upper slide track.

2. An apparatus as set forth in claim 1 wherein the portal opening includes a portal opening axis and the portal opening axis is oriented orthogonally relative to the support base forward surface, and wherein the portal opening axis is arranged parallel to and extends above a top surface of the support tray and is positioned medially of the support tray top surface.

3. An apparatus as set forth in claim 2 including a screw support block fixedly mounted to the stationary guide flange, and the screw support block is oriented orthogonally relative to the portal opening axis, and the screw support block includes a guide block, the guide block includes an internally threaded guide block bore, the guide block bore includes a guide block axis orthogonally oriented relative to the portal opening axis, and an internally threaded rod threadedly received within the guide block bore, and the drive rod including a drive rod head, the drive rod head rotatably mounted within a support block bore, the support block bore defined within a support block, and the support block fixedly mounted to the slide plate rearwardly of the cutting edge, and drive means for selectively rotating the drive rod relative to the guide block bore.

4. An apparatus as set forth in claim 3 wherein the drive means includes a rear and forward flange, the rear and forward flanges are fixedly and orthogonally mounted to the support block extending downwardly therefrom in a spaced parallel relationship, and a resilient driven cylinder rotatably and coextensively mounted between the rear flange and the forward flange, and a reversing motor member mounted to the support base rearwardly thereof, wherein the motor member includes a drive roller, and the drive roller in frictional engagement with the driven cylinder to effect selective rotation of the driven cylinder, and the driven cylinder including a further driven roller, and the further driven roller fixedly mounted to a rear terminal end of the drive rod.

5. An apparatus as set forth in claim 4 wherein the portal opening includes a fluid absorbent sponge web mounted within the portal opening, and the sponge web includes a sponge web slot aligned with the portal opening outer circumference to receive the cutting edge within the slot, and a reservoir container mounted to the upper track, with the reservoir opening including a reservoir nozzle positioned adjacent to and above the sponge web, with liquid chloroform contained within the reservoir to direct liquid chloroform onto the sponge web.

* * * * *